(12) United States Patent
Pedersen et al.

(10) Patent No.: US 8,311,779 B2
(45) Date of Patent: Nov. 13, 2012

(54) MULTIPOINT GEOSTATISTICS METHOD USING BRANCH RUNLENGTH COMPRESSION AND LOCAL GRID TRANSFORMATION

(75) Inventors: Stein Inge Pedersen, Stavanger (NO); Tuanfeng Zhang, Lexington, MA (US); Christen Knudby, Cambridge, MA (US); David S McCormick, Acton, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 512 days.

(21) Appl. No.: 12/341,735

(22) Filed: Dec. 22, 2008

(65) Prior Publication Data

US 2009/0164182 A1 Jun. 25, 2009

(51) Int. Cl.
*G06F 7/60* (2006.01)
*G06F 17/10* (2006.01)
(52) U.S. Cl. ............................................ 703/2; 703/10
(58) Field of Classification Search ................ 703/2, 10; 382/106
See application file for complete search history.

(56) References Cited

U.S. PATENT DOCUMENTS

| 2004/0100956 | A1* | 5/2004 | Watanabe | 370/389 |
| 2006/0041410 | A1* | 2/2006 | Strebelle | 703/10 |
| 2007/0014435 | A1 | 1/2007 | Mirowski et al. | |

FOREIGN PATENT DOCUMENTS

WO 2007008658 A 1/2007

OTHER PUBLICATIONS

Haegland, "Streamline Tracing on Irregular Grids". http://folk.uib.no/fcihh/thesis/thesis.pdf . Dec. 1, 2003. 127 pages.*
Zhang et al. "Non-Stationary Multiple-Point Geostatistical Models"., 2005 Springer. p. 235-244.*
Douglas. Multigrid Methods in Science and Engineering. 1996 IEEE. Winter 1996. p. 55-68.*
Boucher, "Considering complex training images with search tree partitioning", Computers & Geosciences, Elservier XP-002518934, 2008, 8 pages.
Caers et al, "Multiple-point geostatistics: a quantitative vehicle for integrating geologic analogs into multiple reservoir models", in Integration of outcrop and modern analogs in reservoir modeling: AAPG Memoir 80, 2004, pp. 383-394.
Liu et al, "Multiple-point simulation integrating wells, three-dimensional seismic data, and geology", AAPG Bulletin, v. 88, No. 7, 2004, pp. 905-921.
Liu, "Using the snesim program for multiple-point statistical simulation", Computers & Geosciences 32, 2006, pp. 1544-1563.
Strebelle, "Conditional simulation of complex geological structures using multiple-point statistics", Mathematical Geology, v. 34, No. 1, 2002, pp. 1-22.

(Continued)

*Primary Examiner* — Eunhee Kim

(57) ABSTRACT

A multipoint geostatistics computer-implemented method for modeling of discrete properties, comprising acquiring by a computer software program a training image made from at least one dimensional array of discrete property values, the values depicting the spatial relationship and variability considered to be typical of a n-dimensional surface to be modeled; constructing a search tree, the tree representing the probability of occurrence of combinations of values of a discrete property value, the construction being performed by counting these occurrences in the training image. The non-branching sequences of the search tree are compressed to what essentially amounts to a single node, by keeping only the relevant information the sequences contain.

10 Claims, 9 Drawing Sheets

OTHER PUBLICATIONS

Strebelle et al, "Modeling of a deepwater turbidite reservoir conditional to seismic data using multiple-point geostatistics", SPE 77425, SPE Annual Technical Conference and Exhibition, Sep. 29-Oct. 2, 2002, 10 pps.

Strebelle, "Sequential Simulation drawing structures from training images", PhD Thesis Stanford University, 2000, 200 pps.

Guardiano et al., "Multivariate Geostatistics: Beyond Bivariate Moments." Geostatistics Troia, ed. A. Soares, Kluwer Academic Publications: Dordrecht, 1993, vol. 1: pp. 133-144.

* cited by examiner

MULTIPOINT GEOSTATISTICS METHOD USING BRANCH RUNLENGTH COMPRESSION AND LOCAL GRID TRANSFORMATION

FIELD OF THE INVENTION

This invention relates broadly to statistical analysis of random variables that simulate a spatially varying property field. More particularly, this invention relates to multipoint geostatistical methods and simulations.

BACKGROUND OF THE INVENTION

Geostatistics is a discipline concerned with spatially distributed random variables (also called "regionalized variables"), usually applied to problems in the earth sciences, such as estimation of mineral reserves and delineation of mineral deposits, hydrocarbon reservoirs, and groundwater aquifers. Typically it makes use of two-point statistics summarized in a variogram. Multipoint (or multiple-point) geostatistics (MPS) differs from the rest of variogram-based geostatistics primarily in that it characterizes spatial variability using patterns (sets of points and their configurations) that involve higher order (much greater than order 2) statistics.

One of the goals of multipoint geostatistics is simulation, namely the generation of numerical values along a line, on a surface, or in a volume, such that the set of values match certain given spatial correlation or structural properties (usually derived from a data set called an "analog" or "training image" or "template") while optionally (in the case called "conditional simulation") matching predetermined data. In practice, the "analog" may be, for example, a well-known rock volume that is statistically similar to a currently uncharacterized oil reservoir being delineated, and the predetermined data to be matched may be lithology observations at wells, or probabilities of lithologies derived from seismic data. MPS simulations are developed to match two types of constraints: absolute constraints are matched exactly; partial constraints are matched probabilistically, as closely as possible to the constraint value, but they are not guaranteed to match exactly. In the case of petroleum reservoir modeling, examples of absolute constraints are typically data acquired in wells or geological outcrops. Partial constraints are typically derived from seismic data; 1D, 2D, or 3D interpreted spatial trend information; geological category probability fields; or rotation and affinity (or scale) constraints on the size and direction of geological features. Such data are used in a stochastic modeling process to generate one-dimensional (1D), two-dimensional (2D), and/or three-dimensional (3D) spatial distribution of geological categories or rock properties. Since there is a random component involved in MPS simulations, individual stochastic realizations of property fields created by MPS algorithms differ, but the ensemble of realizations provide modelers with improved quantitative estimates of the spatial distribution and uncertainty of values in a modeled volume of interest.

Multipoint geostatistical methods have been demonstrated to be computationally feasible and have been tested on real datasets as set forth in i) Strebelle, "Conditional simulation of complex geological structures using multiple-point statistics", Mathematical Geology, v. 34, n. 1, 2002, pp. 1-22, ii) Strebelle et al., "Modeling of a deepwater turbidite reservoir conditional to seismic data using principal component analysis and multiple-point geostatistics," SPE Journal, Vol. 8, No. 3, 2003, pp. 227-235, and iii) Liu et al., "Multiple-point simulation integrating wells, three-dimensional seismic data, and geology," American Association of Petroleum Geologists Bulletin v. 88, no. 7, 2004, pp. 905-921.

Multipoint geostatistical methods use a numerical training image to represent the spatial variability of geological information. The training image provides a conceptual quantitative description of the subsurface geological heterogeneity, containing possibly complex multipoint patterns of geological heterogeneity. Multipoint statistics conditional simulation anchors these patterns to well data (and/or outcrop data) and to the seismic-derived information (and/or probability field information or constraint grid(s)). An example of such method is described in US-2007-0014435, assigned to Schlumberger Technology Corporation.

Geostatistics relies on the well-known concept of random variables. In simple terms, continuous or discrete properties at various spatial locations are largely unknown or uncertain; hence each property of interest at each spatial location is figured into a random variable whose variability is described by a probability function. In order to perform any type of geostatistical simulation, one requires a decision or assumption of stationarity. In multipoint geostatistical methods, the use of training images is bound by the principle of stationarity as described by Caers, J., and T. Zhang, 2004, "Multiple-point geostatistics: a quantitative vehicle for integrating geologic analogs into multiple reservoir models", in M. Grammer, P. M. Harris, and G. P. Eberli, eds., Integration of Outcrop and Modern Analogs in Reservoir Modeling, Memoir 80: Tulsa, Okla., AAPG. A random spatial field is said to be stationary if all of its statistical parameters are independent of location (invariant according to any translation). In the case of training images, this stationarity can consist of, but is not limited to, orientation stationarity, where directional elements do not rotate across the training image; and scale stationarity (where the size of elements on the image does not change across the training image).

One multipoint geostatistics method is well known in academia and industry by the name of "Single Normal Equation Simulation" (SNESIM) (Strebelle, S., 2000, "Sequential simulation drawing structures from training images, PhD thesis, Stanford University, 200p). The SNESIM method is generally considered useful for practical applications such as modeling categorical or discrete data types, especially for categorical data in 3D property modeling. In the SNESIM method, the conditional probability density function of all categories at one point is computed using knowledge of the value at a number of nearby points and statistics provided by the training image. SNESIM works with discrete values only (i.e., a finite and usually small number of categories, such as for example five different rock types). Assume there are two categories to be simulated: A ("non-channel") and B ("channel"). The training image contains a complete representation (i.e., an example) of a spatial distribution of A and B (for example, see FIG. 2). Assume further that the category present at 4 points (points 1, 2, 3, and 4 in FIG. 3), which could represent wells, is known. Conceptually, the SNESIM method computes the probability of finding categories A or B at an unsampled point (point u in FIG. 3) by scanning the training image for all occurrences of the "pattern" (points 1, 2, 3, and 4 in FIG. 3) (that is, the pattern is defined by the relative spatial locations of all five points, and by the categories found at the four points where a value already has been assigned). If five such pattern occurrences (called replicates) are found, and 4 out of 5 replicates show category B at the relative position of the unknown point (u), then the method computes the probability of B at the unknown point, given the particular five-point pattern, to be 4/5 or 80% (while that of A is set to 1/5 or 20%). Furthermore, the method can assign a category to the unknown point by randomly drawing a value from a distribution with 80% probability of B and 20% probability of A if there is no any replicates of the four-point pattern or its sub-patterns found in the training image.

In practice, the SNESIM uses pixel-based (or voxel-based in 3D) sequential simulation method. It starts with a volume to be modeled where all property values are unassigned at all grid cell locations, or one that contains only a few data points to be matched. These volumes are usually represented by a Cartesian grid, where each grid location is called a cell. First, SNESIM decides on a random path for visiting each unassigned cell once and only once. In the first cell, the method searches for nearby known points within a search volume, usually an ellipsoid or rectangular volume around the known point. If one or more known (or already assigned) cells are found, it proceeds as to the next point on the random path as described above to find the probability of finding categories A or B at the unknown point. Armed with the probabilities for each category at the unknown point, the method randomly draws a value (category A or B) from the inferred probability distribution and assigns it to the unknown point. The process repeats at the next cell in the initially-assigned random path until all cells are assigned.

Such methodology was well known in the early 1990's (before it was known as "SNESIM") (Guardiano, F., and R. M. Srivastava, 1993, Multivariate geostatistics: beyond bivariate moments, in A. Soares, ed., Geostatistics-Troia, v. 1: Dordrecht, Netherlands, Kluwer Academic Publications, p. 133-144). One of the limitations of the first MPS approach, however, was that it was extremely computationally intensive to consult the training image multiple times. Precisely speaking, the training image has to be scanned per simulation node; hence the original SNESIM algorithm proposed by Guardiano and Srivastava was very CPU intensive. In 2000, Strebelle developed a technique to store the information contained in the training image in a special tree-like structure that reduced computations enormously (Strebelle, S., 2000, Sequential simulation drawing structure from training images.: PhD Thesis, Stanford University, Stanford, Calif., USA). With this improvement, the methodology was commonly referred to as the SNESIM method, an algorithm that actually traded CPU with memory. Therefore, coupled with the steadily increasing power of digital computers, SNESIM brought the image-consultation problem down to reasonable but still significant processing times and computer RAM memory requirements.

The SNESIM method is based on a tree structure or "search tree" that stores, in a computer's memory, the spatial geometric relationships between values of a discrete variable to be modeled. In the SNESIM method, the search tree is handled as a typical generic tree data structure containing a number of nodes each pointing to one or more other nodes in a tree-like arrangement (FIG. 4). However, building and consulting this structure is a bottleneck of software efficiency, because this structure tends to be very large to contain enough information for modeling property distributions in several dimensions adequately. This is especially the case if the search tree is built for a training image containing more than 2 categorical variables in 3-dimensional space, as is common in real-world modeling applications. To achieve better reproduction of complex patterns from a training image, a large local window is required by SNESIM, to scan the training image. This typically leads to a big search tree in 3D and for training images with multiple facies. Although the method allows the user to set parameters that control and improve this continuity, setting them to the values that would be needed for adequate three (or more)-dimensional modeling, causes the method either to take an impractical amount of time to run, to fail due to lack of RAM memory even on large modern computers, or to produce non-geological modeling artifacts (particularly when modeling in three or more dimensions). Consequently, the resulting model simulation outputs (realizations) produced using the currently known implementation of SNESIM commonly exhibits unacceptable continuity of spatial features.

Furthermore, the SNESIM method shows a significant computational drawback, because it has not been realized that in practice the SNESIM search tree structure does not really resemble a tree, but rather consists of many long non-branching sequences (or "runlengths") (see FIG. 6, left side). Handling these in the same manner as a conventional tree structure is very inefficient.

Additionally, the SNESIM method exhibits an additional computational drawback when attempting to simulate non-stationary spatial trends such as rotational and scaling transformations. To mimic local affine transformation information (such as the effects of changes in geological sedimentation directions or the spatial changes in geological feature aspect ratios), SNESIM as published needs to divide the simulation grid into different regions of constant scaling and/or rotational transformation. The method then creates a new search tree for each affine transformation region. For common real-world applications, this commonly means defining as much as 10 regions, thus requiring the creation of as much as 10 search trees per simulation, which is both processing time- and memory intensive.

Finally, the SNESIM method as published attempts to generate the search tree or trees (in the case of multiple simulation regions), and run a simulation of the property field in a single computational workflow. This means in practice that if the input parameters that control the construction of the search tree are changed, a separate simulation must be performed for each change in the search tree. This precludes the use of SNESIM in an automated workflow, for example, to assess sensitivity to variations in training image input parameters, or a workflow where multiple training images are for a given set of conditioning data or varying amounts of conditioning data.

SUMMARY OF THE INVENTION

The invention significantly improves known multipoint geostatistics method shortcomings. According to the method of the invention, modeling tasks that were previously impossible are now practical, and those that were possible can be achieved in a much shorter time and using fewer computer resources.

The invention further provides a multipoint geostatistics computer-implemented method for modeling of discrete properties, said method comprising:
  acquiring by a computer software program a training image made from at least one-dimensional array of discrete property values, the values depicting the spatial relationship and variability considered to be typical of a n-dimensional surface to be modeled;
  constructing a search tree, the tree representing the probability of occurrence of combinations of values of a discrete property value, the construction been performed by counting these occurrences in the training image
wherein the non-branching sequences of the search tree are compressed to what essentially amounts to a single node, by storing only the relevant information the sequences contain.

The invention also provides a multipoint geostatistics computer-implemented method for modeling of discrete properties, said method comprising:

acquiring by a computer software program at least one training image made from at least a one-dimensional array of discrete property values, the values depicting the spatial relationship and variability considered to be typical of a n-dimensional surface to be modeled; said values being arranged as cells into a simulation grid, constructing a search tree, the tree representing the probability of occurrence of combinations of values of a discrete property value;

wherein the tree structure is created only once per training image, i.e. for a simulation involving changes in the scaling and rotation to match local non-stationary trends on the simulation grid.

This decoupling the MPS training stage (search tree construction) from the simulation allows modelers to reuse the search tree to generate different MPS simulations. This helps automating MPS workflow and saves significant CPU time in case a large 3D training image is required.

Advantageously, the method comprises preparing the modeling of discrete properties by the steps of binning the ranges of rotation azimuth field and the scaling field into a finite number of categories such that for each category, a constant rotation and scaling can be assumed; dividing the simulation grid into a series of sub-regions according to each constant binning of the rotation and scaling; performing the simulation in sequence from one sub-region to another, wherein, in each sub-region, the simulation grid is rotated or/and in-filled/coarsened according to the rotation azimuth or/and scaling factor in that region to form a transformed grid, and wherein the search tree used for the simulation over all regions is the same one as generated from the first training image; assigning the simulated value at each cell of the transformed grid to the nearest cell in the original grid for each sub-region.

This embodiment of the method of the invention allows using local grid transformation, rather than creating a bunch of search trees by transforming the training image in the original SNESIM, to perform MPS simulations. This implementation not only leads to significant reduction of memory cost but also allows reusing the original search tree regardless of which azimuth or/and scaling grids are used to generate non-stationary MPS simulations from the stationary training images.

Advantageously, the cell data within each sub-region are transformed after search tree creation and before the simulation is conducted on the transformed grid.

Advantageously, the simulated cell values in the neighboring regions that are adjacent to the borders are used as constraints to be matched in the simulation of a sub-region.

Advantageously, the method comprises a step allowing to designate at least one sub-region to which at least one particular search tree will be applied. Particularly, simulated cell data may be selected as constraints to be matched in the simulation of an adjacent sub-region.

Advantageously, the invention also provides a computer-implemented multipoint geostatistics method for modeling of discrete properties wherein the steps of making the search tree and the step of making multipoint geostatistical simulations are made from distinct steps, said steps comprising:

creating in an automated way by a computer software program one or more search trees using a stored set or sets of search-tree-creation input parameters in order to create a set of one or more search trees that may be used separately in the multipoint geostatistics simulations; these search trees being stored in RAM memory or saved to a physical storage device, allowing later reuse in one or more simulations;

creating in an automated way by a computer software program a set of multipoint geostatistical simulations) using one or more of the previously-created search trees and a stored set or sets of geostatistical simulation input parameters; in order to create one or more geostatistical simulations;

Since the steps of search tree creation and multipoint geostatistics simulation have been separated, there is considerable ability to improve the time- and memory consumption requirements of a full multipoint geostatistical workflow. Search trees with a given set of input parameters need only be created once for use in multiple multipoint geostatistical simulations. Search trees may be stored as examples of particular simulation settings for later re-use potentially by other users. Search trees can be retrieved either from RAM or physical storage memory.

Additional objects and advantages of the invention will become apparent to those skilled in the art upon reference to the detailed description taken in conjunction with the provided Figures.

It will be recognized by the person of ordinary skill in the art, given the benefit of this disclosure, that certain dimensions, features, components, and the like in the figures may have been enlarged, distorted or otherwise shown in a non-proportional or non-conventional manner to facilitate a better understanding of the technology disclosed herein.

DETAILED DESCRIPTION OF THE INVENTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1:
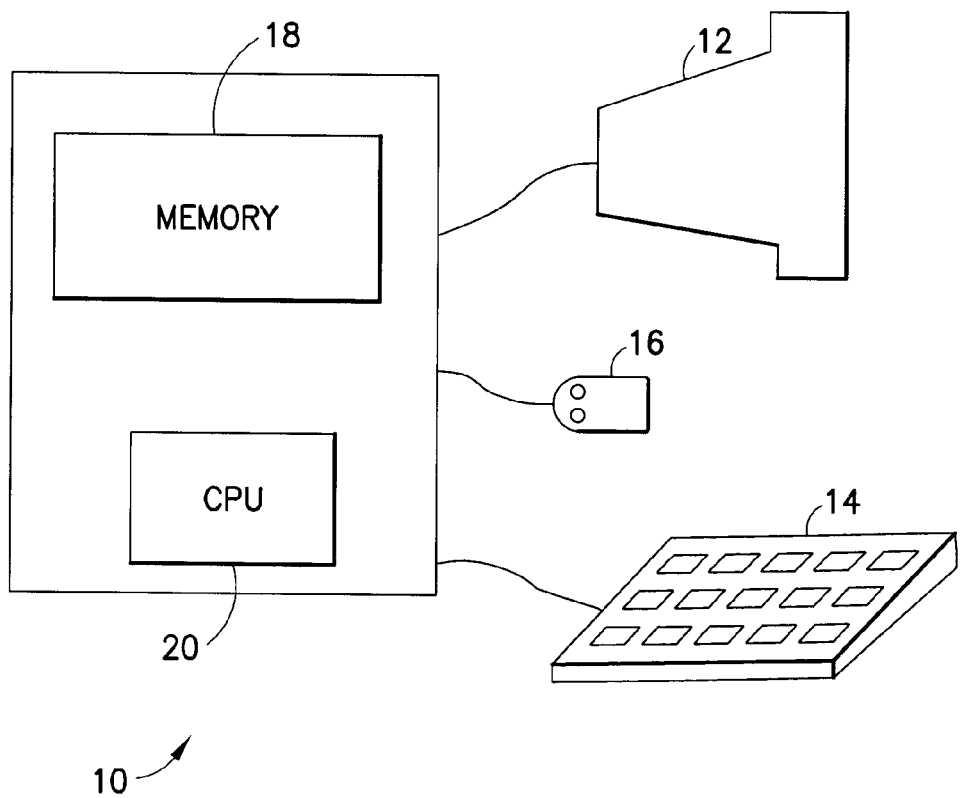
FIG. 1 is a block diagram of a computer processing system that embodies the method of the present invention.

FIG. 1 is a functional block diagram of a general purpose computer system 10 that embodies the present invention. The computer system 10 may include a work station (or high performance personal computer) that performs the relevant computations and decision logic as discussed below, e.g., training image processing, training image stationarity statistics generation and evaluation, and multipoint statistical analysis based thereon. For example, the computer system 10 may include a display device 12 and user input devices such as a keyboard 14 and mouse 16. The computer system 10 also includes memory 18 (e.g., persistent memory such as a magnetic hard disk drive as well as non-persistent memory such as one or more DRAM modules) that stores software application(s) that are executed on a processor 20 to perform the relevant computations and decision logic as discussed below, e.g., training image processing, training image stationarity statistics generation and evaluation, and multipoint statistical analysis based thereon. Such software applications, which comprise a programmed sequence of instructions and data, are typically stored on one or more optical disks that are loaded into the memory 18 by an optical disk drive (not shown) for persistent storage therein. Alternatively, such software applications can be loaded into the memory 18 over a network connection (e.g., an Internet connection) or other suitable means for persistent storage therein. In the description below, the "image" refers indistinctly to either a line or a surface or a volume, and consists of a contiguous array of equal cells, each of which may contain a value (or number).

Figure 2:
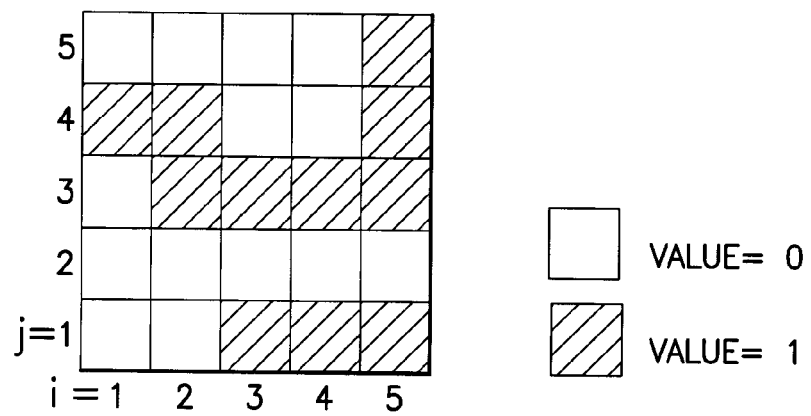
FIG. 2 is an example of a simple two-dimensional training image known in the prior art with a variable that can take two possible discrete or categorical values.

The search tree used by prior art multipoint geostatistics methods like the SNESIM one (FIG. 4) stores all pattern replicates found within a given search mask (FIG. 3) from the "training image" (FIG. 2). The training image is a numerical representation of spatial patterns in an n-dimensional space. For example, when modeling lithofacies (lithological rock types) in a yet relatively unknown hydrocarbon reservoir, a training image may represent the three-dimensional spatial arrangement (n=3) of lithofacies that shows geological elements such as ancient river channels, levees, and interchannel areas with geometric shapes and spatial relationships that are similar to those interpreted to be present in the unknown reservoir. A series of 3D training images could be used to reflect time-series pattern changes, like those images used in repeat (4D) seismic imaging.

Figure 3:
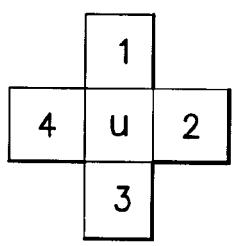
FIG. 3 is an example of a minimal version of a search neighborhood (or "search mask") for image of FIG. 2, involving a central cell (u), and four surrounding cells (1, 2, 3, 4).
Figure 4:
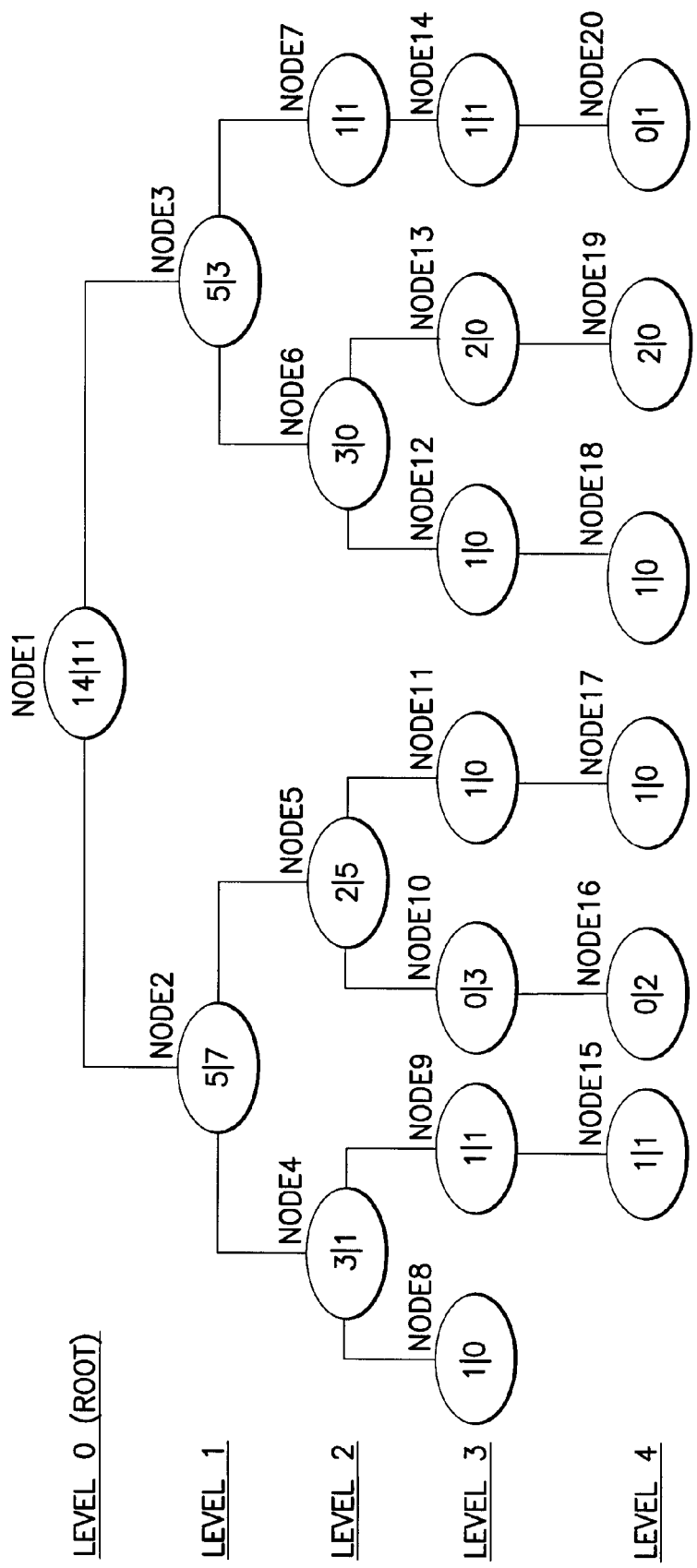
FIG. 4 is an example of how a prior art tree stores the replicates of patterns found in a training image as the one of FIG. 2, with two values, 0 and 1.

FIG. 2 represents a 5×5 simplified two-dimensional training image known in methods of prior art, with a variable that can take only two discrete values: 0 and 1. FIG. 3 shows a version of a search neighborhood (or "search mask") involving a central cell (u) and four surrounding cells (1-4). The probability of occurrence of a value in the center of the search neighborhood is to be estimated by counting its occurrence in the training image given fixed values in one or more of the surrounding cells in the pattern. The search tree represents the probability of occurrence of combinations of values of a discrete variable, which is estimated by counting these occurrences in the training image. It is referred to as a "tree" because it represents these occurrences recursively. FIG. 4 shows a search tree for a binary image as used in the SNESIM method corresponding to the training image in FIG. 2. This standard tree is used for storing the patterns found in the training image with two values, 0 and 1. The observed sequence of values in the search neighborhood is stored in the branches of the tree. The tree holds 20 observations of the various data configurations within the search mask. Not all configurations are possible and are represented by incomplete branches in the tree (i.e., some nodes are missing, even though the total depth of the tree structure is 4). The numbers inside the nodes represent the number of times that the values 0 and 1 respectively occur at the center of the search neighborhood (u) in which left value corresponds to observing 0 and right value for observing 1 at center (u). Every possible combination of values in the search neighborhood's surrounding cells (cells 1, 2, 3, and 4 in FIG. 3) can be represented by an ordered set of N binary values, where N is the number of surrounding cells (in this example N=4). An unknown value of the variable at surrounding cell i can be represented by $x_i$, where i can vary from 1 to N. Thus, [1, $x_2$, $x_3$, $x_4$] represents a pattern containing the value "1" in cell 1 and unknown values in the remaining cells. The level-0 or root node contains the counts of the patterns [$x_1$, $x_2$, $x_3$, $x_4$] for which the central value is 0 or 1 (these counts are 14 and 11, respectively, in this example); it corresponds to the histogram or a one-point statistic. The first level-1 node (node 2 in this example) contains the counts of the patterns [0, $x_2$, $x_3$, $x_4$] for which the central value is 0 and 1 respectively; there are 5 (left) and 7 (right) replicates of this pattern. The second level-1 node (node 3 in this example) contains the counts of the patterns [1, $x_2$, $x_3$, $x_4$] for which the central value is 0 and 1, respectively, the corresponding numbers are 5 (left) and 3 (right). These level nodes inform 2-point statistics. This hierarchy continues downward until the lowest level (level 4 in this example), in which all patterns are represented explicitly. For example, for the pattern [0,1,0,1] (node 16 at level 4 in this example), the value 0 does not occur at the neighborhood center, and the value 1 occurs twice. The center node count is accumulated towards the top of the tree, and the numbers inside the root node always represent the count of patterns containing the value 0 and 1 in the training image.

According to FIG. 4, for any single cell in a training image, the variable can take M possible values (where M represents the maximum number of modeled categories, such as for example, all the possible rock types in a reservoir; in FIGS. 2 and 4, M=2). This gives rise to a branching of up to M-fold at the first node. Assuming that the first cell has a given value, a second cell within a search neighborhood may in turn have M possible values. This results in a branching of up to M-fold at the next node. For a third and subsequent nodes, further M-fold branches are possible. If the tree was represented in its entirety, it would contain N to the power of M nodes at level N (16 nodes in this example). Some of the nodes may have a count of 0, in which case the descendants are not shown and typically not represented in the prior-art trees. This happens very often because well-suited training images contain well organized and repeated patterns. This reduces its size somewhat, but nevertheless the resulting structure is typically very large, causing a bottleneck of software efficiency.

Figure 6:
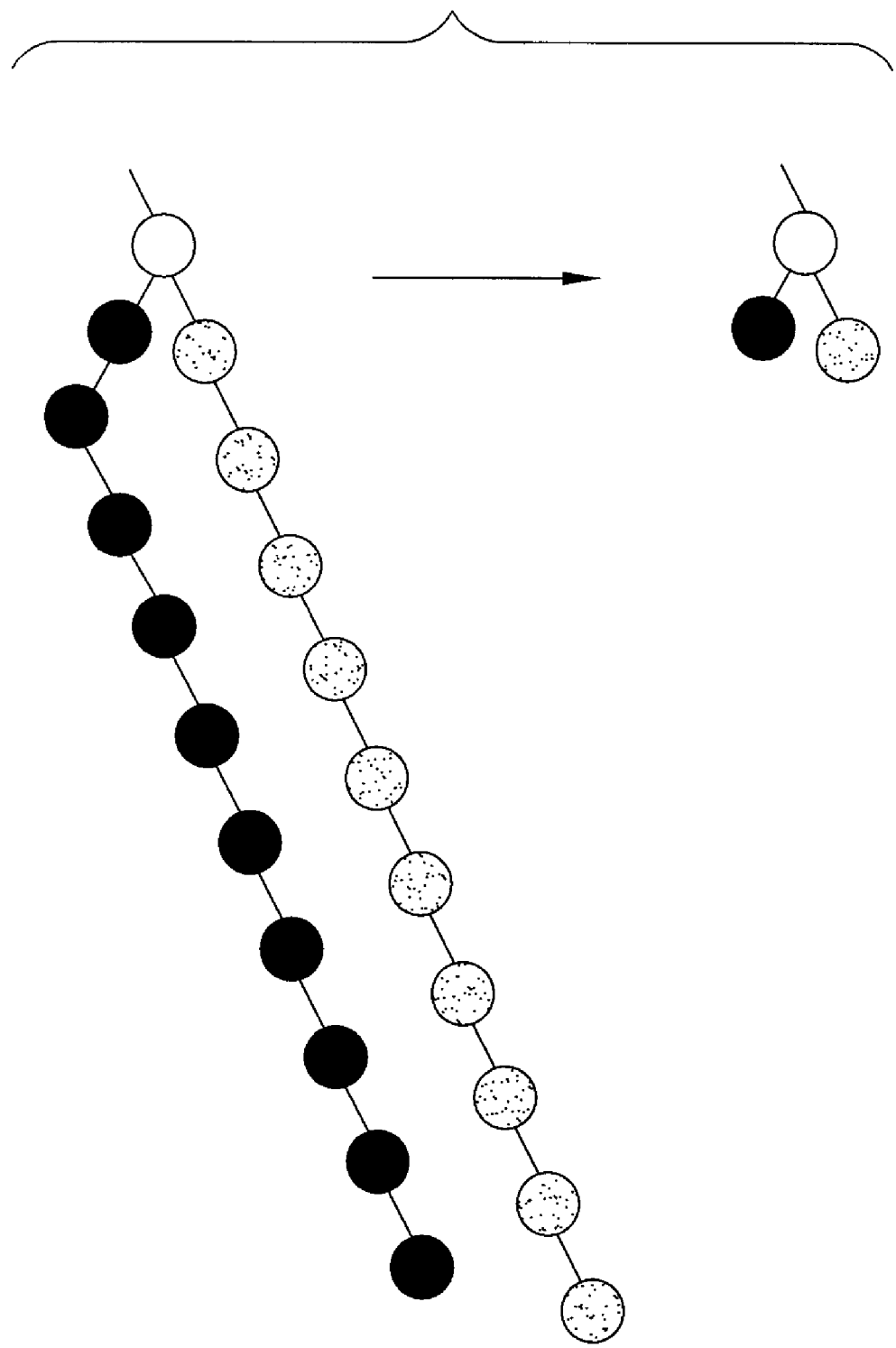
FIG. 6 shows how redundant information in non-branching sequences of nodes in the tree (left), which can be either the middle tree nodes or end branches of the tree, can be efficiently stored and summarized in only two nodes (right) according to the method of the invention.

It has been discovered in this invention that in most cases according to this prior art methods, this tree structure contains many long non-branching sequences. FIG. 6 illustrates that for large search neighborhoods (for example, N>50 points) the non-branching sequences may become very long.

Figure 5:
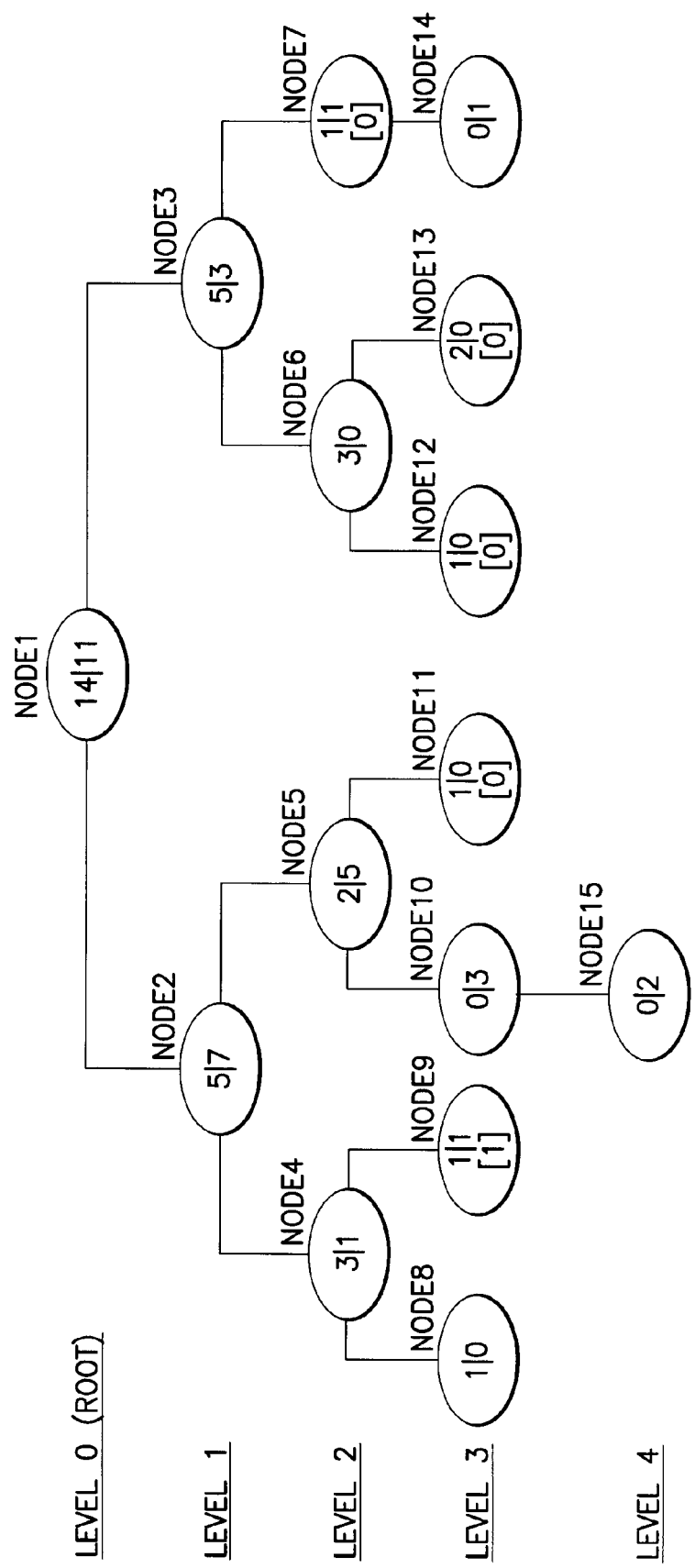
FIG. 5 is an example of a compressed version of the prior art tree shown in FIG. 2 according to the method of the invention.

The number of branches at each node, though theoretically up to M, is in practice much smaller, because many combinations of values simply do not occur (FIG. 4). Moreover, the actual branching multiplicity is very often just 1, especially for a large search neighborhood, in nodes farther along the tree's hierarchy. The present invention exploits this structure by reducing the long non-branching sequences to only the essential information they contain, such as the number of repeating nodes and the repeating nodes' common properties. This new encoding of parts of the tree results in a much reduced size of the tree known in the art and consequently of the time needed to access it by software. Therefore, FIG. 5 shows a tree according to one embodiment of the invention. This tree contains exactly the same information as the tree in FIG. 4. Nodes that contain a bracketed number (e.g. "[1]") carry information both on the number of replicates at the level of the node itself (levels 2 and 3 for the five nodes with bracketed numbers), and in addition information on the non-branching sequence of nodes below the node in question. Pattern [0,1,1,0] (node 11) now requires three nodes from the root (FIG. 5), compared to four nodes in the traditional tree (node 17 in FIG. 4). The [0,1,1] part, the values in the particular pattern corresponding to locations 1, 2 and 3 in the search mask, is common to both [0,1,1,0] and [0,1,1,1], so the first is stored as the link from the root node, and the second is stored inside the first node, which is called subpattern and is stored as byte in the implementation of the compact tree. This saves the space of keeping an extra node in memory, and it saves the need to store the "110" (two integers) twice. Hence, in principle, those nodes in the original tree (FIG. 4) that belong to a single branch and share the same number of pattern replicates, are compressed into one node in the new tree (FIG. 5) that contain the shared replicates as well as the condensed subpattern. This tree compression also allows to fast retrieval of the replicates for a given pattern. FIG. 5 illustrates how the method according to the invention leads to a tree that is significantly compressed compared to the one represented in FIG. 4. In the example, the training image in FIG. 2 requires only 15 nodes according to the method of invention (FIG. 5), compared to the 20 nodes in the prior art search tree (FIG. 4). When applying the method of the invention to training images that result in non-compressed trees like the one shown in FIG. 6, the efficiency gain becomes even more significant. FIG. 6 illustrates that the tree can be further condensed if all the nodes in a single red (or blue) branch have the same replicate number for value 1 or 0. All red (or blue) nodes can be summarized into 1 red (or blue) node. In the node, in addition to the storage of the common replicates numbers, an array that indicates the red (or blue) branch path (subpattern) may be stored in the node for retrieving the entire pattern. This principle also applies for a training image that contains M categories. According to the method of the invention, various embodiments are available to achieve the compression of non-branching sequences.

In addition to the memory efficiency, this compact tree structure also allows faster retrieval of probabilities from the search tree, hence improving CPU efficiency in MPS simulation. During the scanning of the training image the method of invention only allocates additional nodes when a new pattern is searched for and found in the training image, and only if the new pattern is not the only extension found so far of the pattern corresponding to the branch's end node. If that was the case, the new subpattern would be stored as additional compressed run-length information in the branch's end node. The prior art tree allocates nodes to the maximum depth of the replicate pattern. By not allocating extra nodes, the method of invention achieves significant savings of memory and speedup in scanning the search tree during tree construction and during stochastic simulation.

After the search tree is generated, it is used to perform an MPS simulation that results in a model consisting of a grid of values with statistical characteristics similar to those of the training image, and matching absolute and partial constraints. This process involves, among other steps, consulting the search tree to obtain the probability that the center of the neighborhood contains a certain value, given that some of the neighborhood cells contain known values. When the constraints dictate that the model must be rotated or scaled relative to the original training image, in the prior art a new tree is generated for each combination of rotation and scaling constraints. In this invention, a single tree is generated, and used for all possible rotations and scalings. The rotation and scaling are achieved by transforming the locations of the model simulation grid. The nodes of the transformed grid typically do not coincide with the nodes of the model. Therefore, the values assigned to the model are interpolated or assigned from the nearest nodes in the transformed grid. In one embodiment of the invention, a nearest-neighbor interpolation is used, but other forms of interpolation may be used as well. The constraints may specify rotation and scaling that must vary spatially within the model. In both the prior art as well as in this invention, the simulation model is partitioned into a finite number of regions, such that the rotation and scaling are constant within each region. Each region is modeled separately. In each region, values that have already been modeled around the periphery of neighboring regions may be used may as absolute constraints to ensure continuity across region boundaries. In the prior art, modeling many regions is a far lengthier process than in this invention, both because the prior art requires the generation of many search trees, and because generating and consulting each tree in the prior art is lengthier due to the much larger sizes of the search trees.

Figure 7:
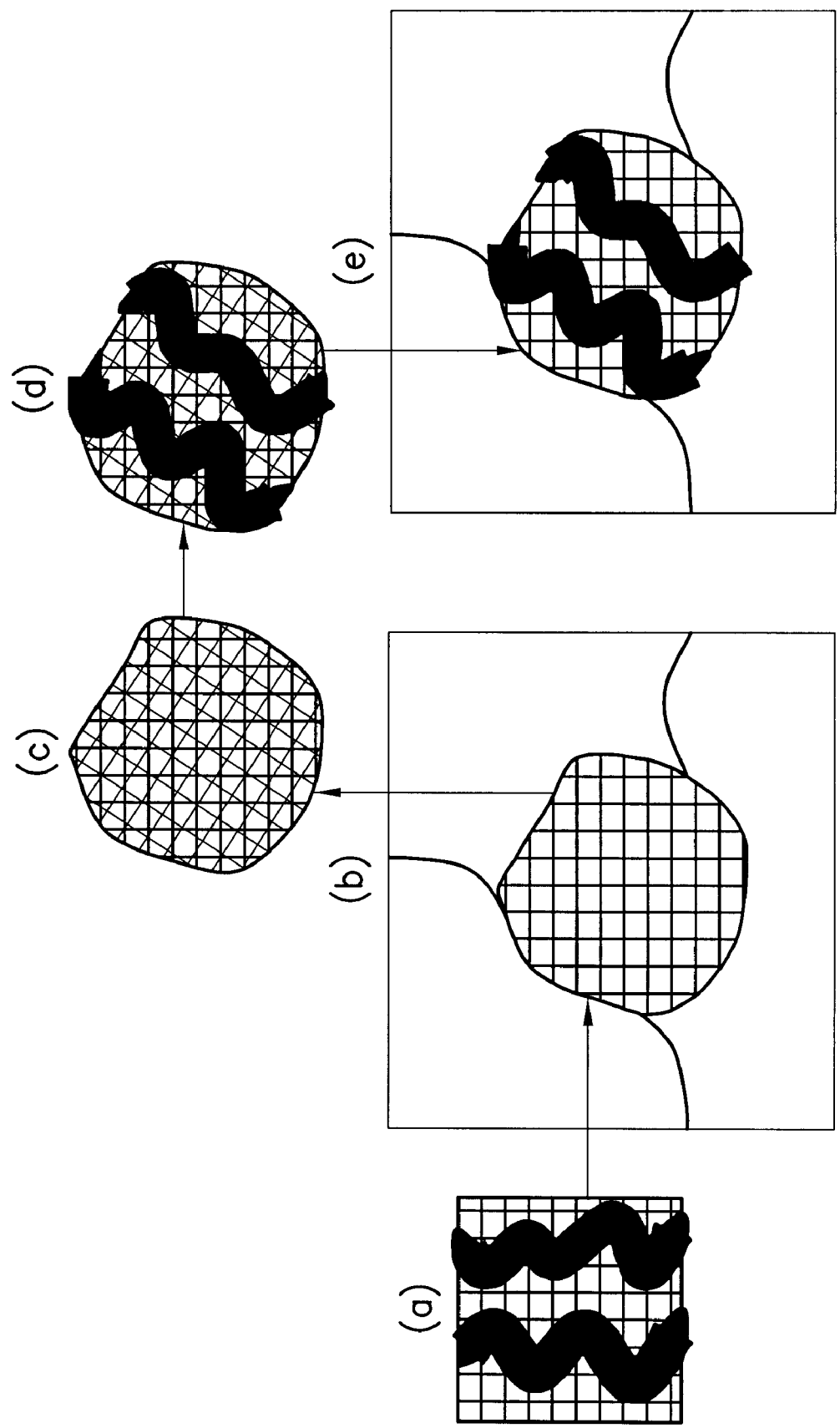
FIG. 7 is an example of an illustration of the process used for the rotation of simulation grid.

FIG. 7 illustrates the process that is used to perform MPS simulation in regions when rotation is required. Element 7a is a training image showing black features elongated from top to bottom. Element 7b is the entire simulation space with sub-region divisions (the middle region with grid lines are used for illustration purpose). Element 7*c* shows the rotated grid (red) with an azimuth 30 degrees. Element 7*d* shows the simulated features in the rotated grid system. Element 7*e* displays the final simulation of features in the original grid by re-sampling the simulated features from rotated grid (red) in element 7*d* to the original grid (blue).

Figure 8:
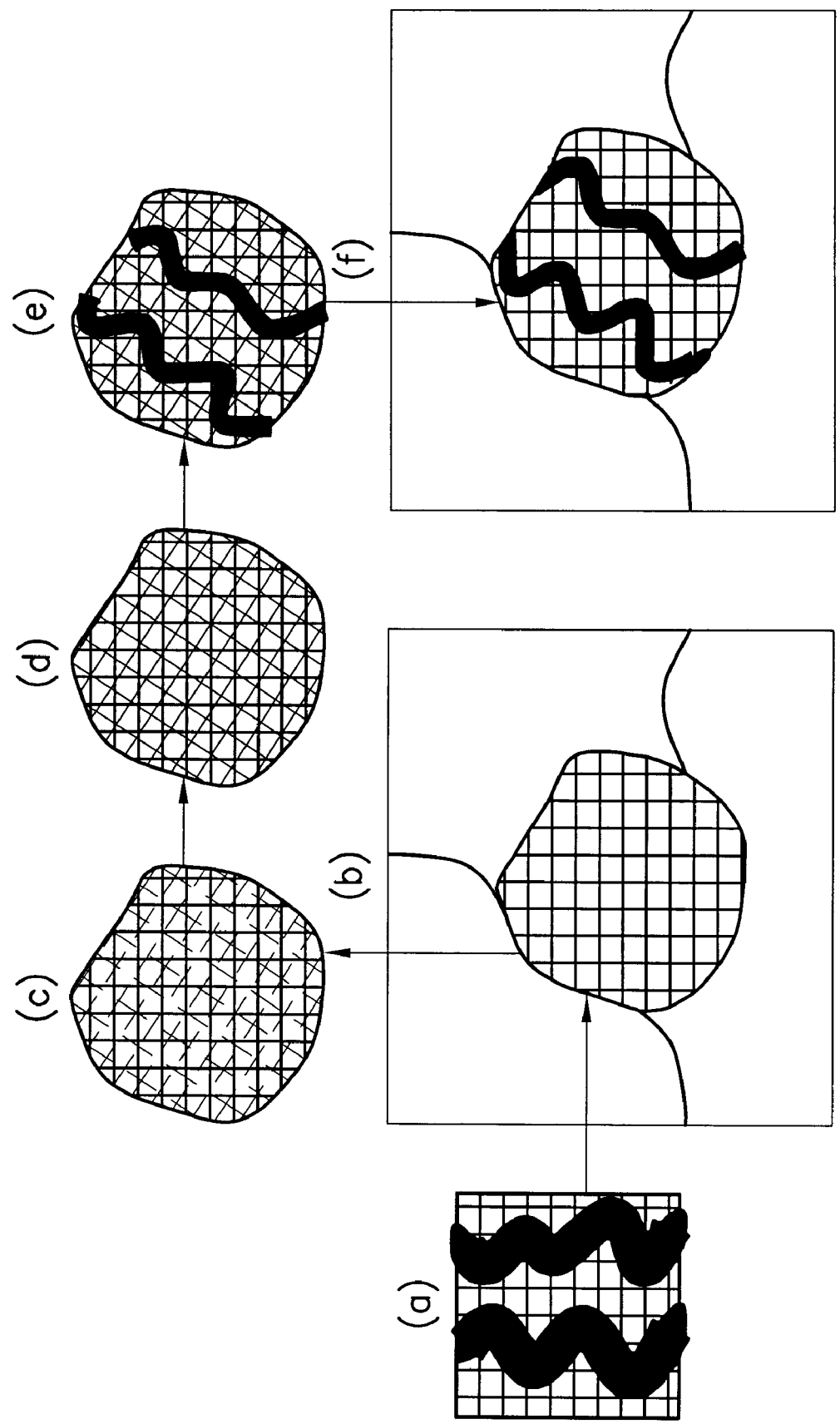
FIG. 8 shows the embodiment of the process of the invention when both rotation and scaling are required.

If there is a scaling factor to be applied in addition to rotation the modeled grid is transformed by both rotation and scaling. FIG. 8 is an illustration of such process. In this example, the purpose is to simulate features with width being half of that in the training image in addition to a 30 degree azimuth orientation. Besides all the procedures in FIG. 7, interpolation along the x-direction over the rotated grid is performed (see element 8*d*) for the purpose to simulate thinner features. The final re-sampling step leads to the desired features in the MPS simulation. Note that scaling factors may be applied in x-, y-, and z-directions independently. Additionally, any other spatial transformations besides rotation and scaling may in principle be applied in the modeling step without the need to generate additional search trees.

Figure 9:
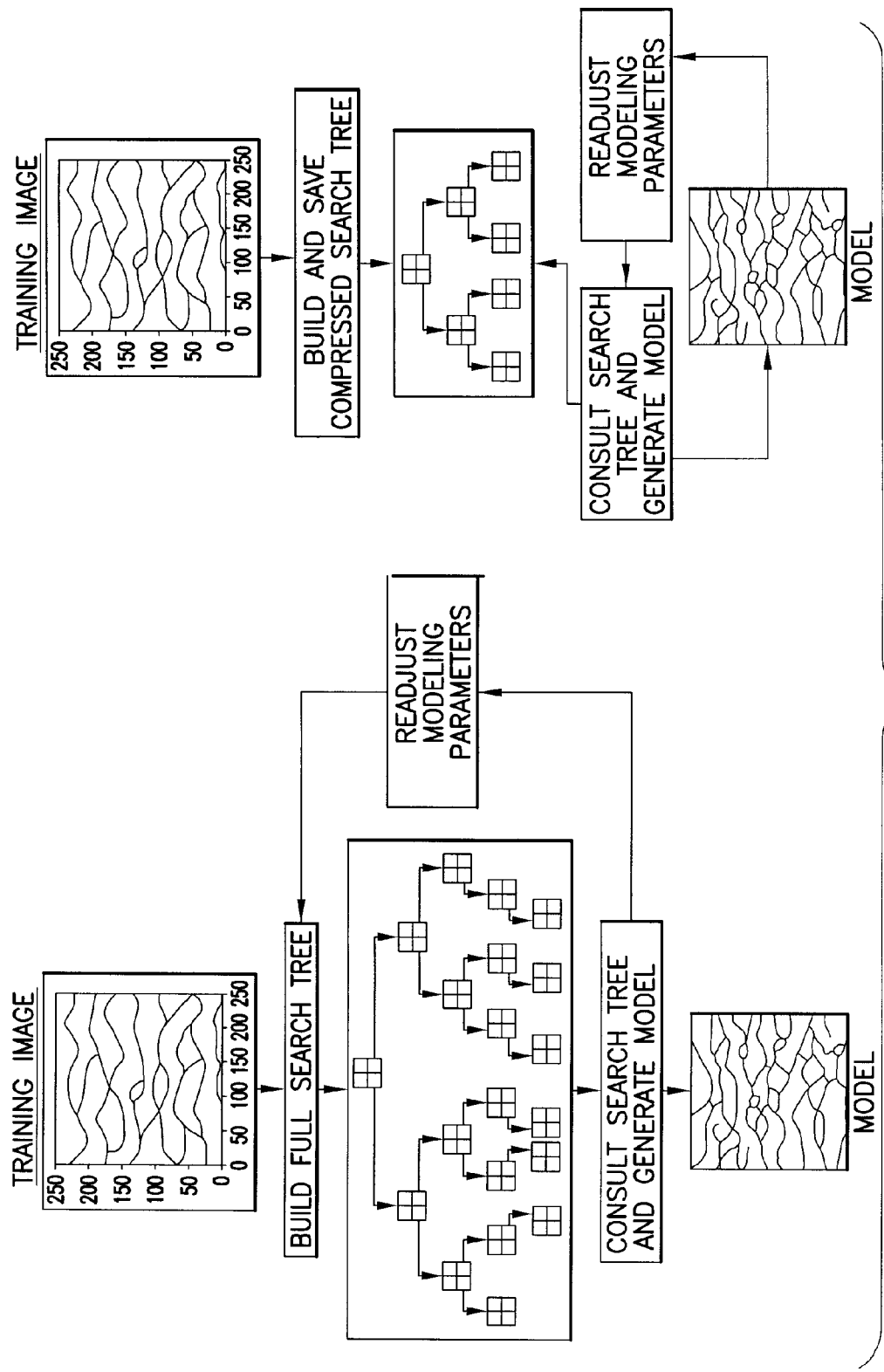
FIG. 9 represents a prior art method flow chart and an example of a flow chart according to a preferred embodiment of the invention for the use of region-based transformations with a single search tree.

In the preferred embodiment of the method of the invention, for a single set of search tree creation parameters (e.g., search mask size, etc.) the newly encoded search tree structure is generated only once for each training image to be simulated and stored for reuse potentially in multiple simulations, as shown in FIG. 7. This reuse was very difficult to achieve with the multipoint geostatistics method of the prior art due to the tree's large size (see prior art flow chart in FIG. 9). Although the prior art SNESIM method allows the user to create a set of realizations (instances of a stochastic model) with only one creation of the search tree, the multipoint geostatistical simulation could only be performed with identical simulation input parameters, other than varying the stochastic simulation random seed parameter for grid visitation path. If the user needs to change parameters other than the random seed and rerun the modeling process, in the prior art method the search tree must be rebuilt. The elimination of the step of building the tree before carrying out each new simulation run according to the method of the invention further reduces the total time involved. This is important for practical applications as for example the ones related to geologic modeling in three-dimensional space.

Figure 10:
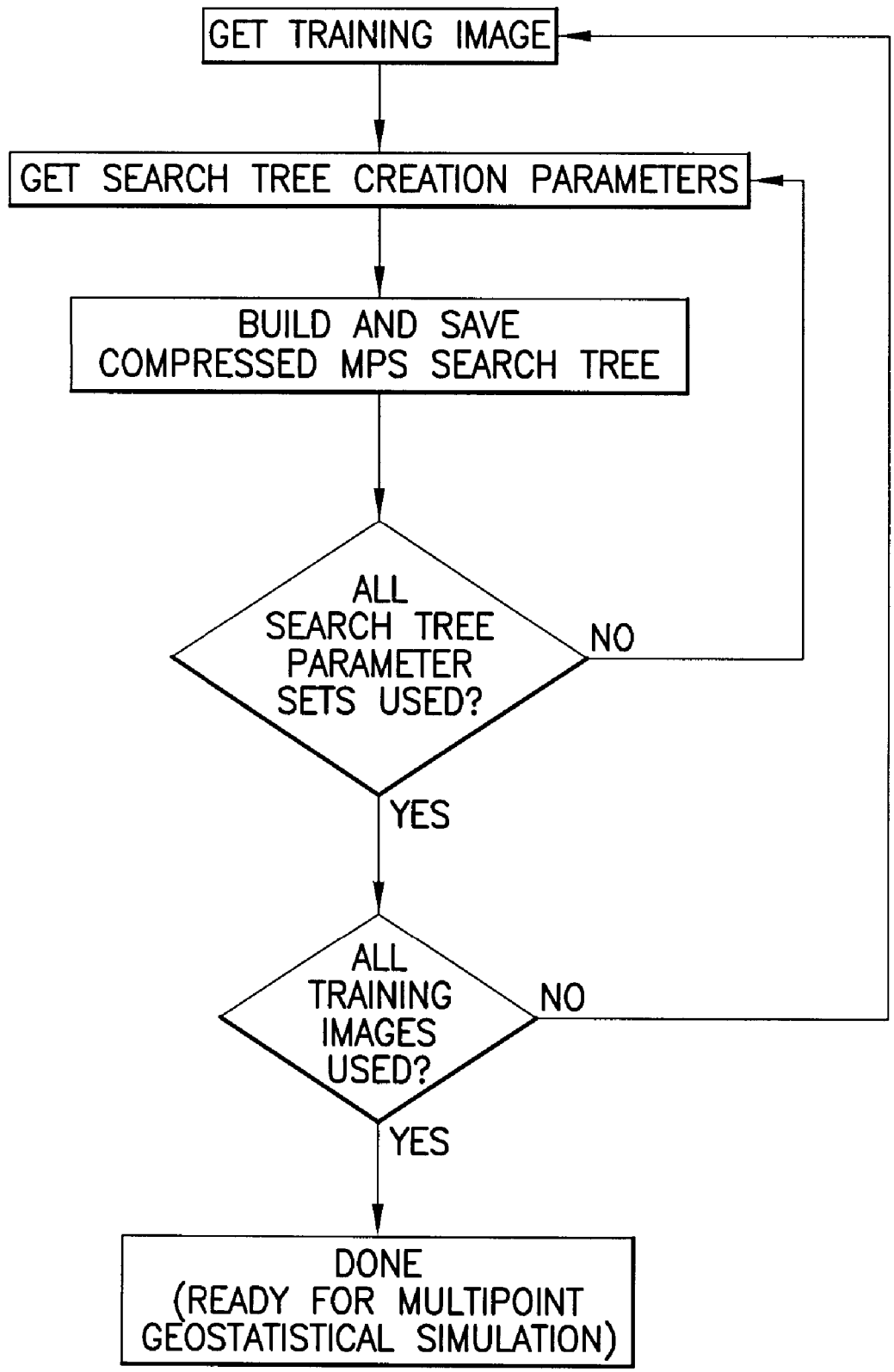
FIG. 10 represents a preferred embodiment flow chart demonstrating the automated workflow for creating multiple search trees from one or more training images.
Figure 11:
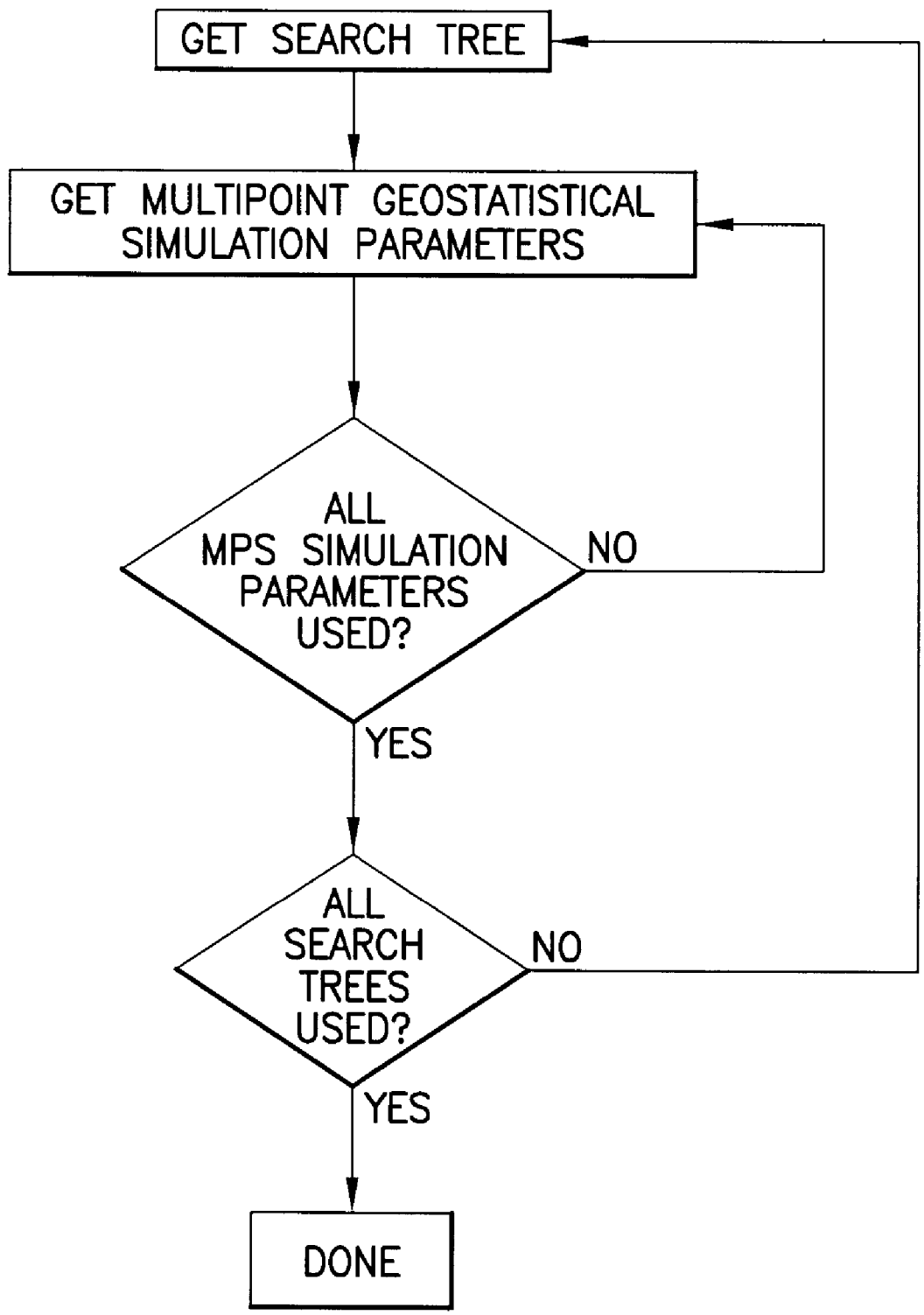
FIG. 11 represents the preferred embodiment flow chart demonstrating the automated workflow for creating multipoint geostatistics simulations from one or more search trees.

In the preferred embodiment of the method of the invention, the search tree creation and simulation steps are completely separated (FIGS. 10 and 11). This allows the use of automated workflows for creation of, for example, multiple search trees with differing search tree creation input parameters (FIG. 10) and the creation of a hierarchy of multipoint geostatistical simulation (FIG. 11) which may include multiple search trees as well as multiple sets of simulation parameters. This allows great speed-up by not requiring the recreation of search trees with the same input parameters.

Furthermore, by separating the process of creating search trees from the stochastic simulation, this allows the physical storage of search trees for later reuse, which has not been possible before this invention. This has practical advantage for both conserving computer memory and allowing and efficient automated batch computational process. In addition, this separation allows the storage, cataloging, searching and reuse of search trees as examples (analogs) for similar discrete properties. By storing the parameters associated with building the search tree and the embodied characteristics of the search tree itself, one can quantitatively assess the similarity of different search trees and training images.

Experimental tests have been performed with the method of the invention that demonstrated at least a three-fold reduction in runtime, and simultaneously at least a ten-fold reduction in memory usage in all cases, with greater improvements observed frequently depending on the characteristics of the image and parameters used in the modeling. This allows the user to use larger search mask to achieve better shape reproduction.

There have been described and illustrated herein a computer-based method for automatically computing more quickly the training images for use in multipoint geostatistical analysis, enabling to model discrete properties in subsurface. The most common applications of these methods are for the modeling of discrete geological properties for petroleum geology and reservoir simulation, groundwater hydrology, $CO_2$ sequestration, geological outcrop modeling, and 3D image reconstruction, among others. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A multipoint geostatistics computer-implemented method for modeling of discrete properties, said method comprising:
    acquiring by a computer software program a training image made from at least a one dimensional array of discrete property values;
    said values depicting a spatial relationship and variability considered to be typical of a n-dimensional surface to be modeled;
    constructing a search tree, the tree representing a probability of occurrence of combinations of values of the discrete property value, the construction being performed by counting these occurrences in the training image;
    wherein non-branching sequences of the search tree are compressed to what essentially amounts to a single node, by keeping only relevant information the sequences contain; and
    wherein the relevant information comprises a number of replicates at a level of the node and the non-branching sequences below the node.

2. The method of claim 1 wherein the single node comprises the shared replicates and a condensed sub-pattern.

3. A multipoint geostatistics computer-implemented method for modeling of discrete properties, said method comprising:
    acquiring by a computer software program at least one training image made from at least a one-dimensional array of discrete property values, the values depicting a spatial relationship and variability considered to be typical of a n-dimensional surface to be modeled; said values being arranged as cells into a simulation grid
    constructing a search tree, the tree representing a probability of occurrence of combinations of values of a discrete property value;
    wherein non-branching sequences of the search tree are compressed to what essentially amounts to a single node, by keeping only relevant information the sequences, the relevant information comprising a number of replicates at a level of the node and the non-branching sequences below the node; and
    wherein the tree structure is created only once for the at least one training image for a simulation involving changes in a scaling and rotation to match local non-stationary trends on the simulation grid.

4. A method according to claim 3, wherein the method comprises preparing the modeling of discrete properties with the steps of:
- binning a range of rotation azimuth field and a scaling field into a finite number of categories such that for each category, a rotation and scaling can be assumed;
- dividing the simulation grid into a series of sub-regions according to each binning of the rotation and scaling;
- performing the simulation in sequence from one sub-region to another, wherein in each sub-region, the simulation grid is rotated or/and in-filled/coarsened according to the rotation azimuth or/and scaling factor in that region to form a transformed grid, and wherein the search tree used for the simulation over all regions is the same one as generated from a first training image;
- assigning a simulated value at each cell of the transformed grid to a nearest cell in the original grid for each sub-region.

5. A method according to claim 4, wherein cell data within each sub-region are transformed after search tree creation and before the simulation is conducted on the transformed grid.

6. A method according to claim 4, wherein the simulated cell values in a neighboring region that are adjacent to a borders are used as constraints to be matched in the simulation of a sub-region.

7. A method according to claim 6 comprising a step allowing to designate at least one sub-region to which at least one particular search tree will be applied.

8. A method according to claim 7, wherein the simulated cell values are selected as constraints to be matched in the simulation of an adjacent sub-region.

9. A computer-implemented multipoint geostatistics method for modeling of discrete properties, comprising:
- creating in an automated way by a computer software program one or more search trees using at least one stored set of search-tree-creation input parameter in order to create a set of at least one search tree in the multipoint geostatistics simulations wherein non-branching sequences of the search tree are compressed to what essentially amounts to a single node, by keeping only relevant information the sequences contain, the relevant information comprising a number of replicates at a level of the node and the non-branching sequences below the node;
- creating in an automated way by a computer software program a set of multipoint geostatistical simulations using one or more of the previously-created search trees and at least one stored set of geostatistical simulation input parameter; in order to create at least one geostatistical simulations; and
- wherein the step of creating one or more search trees and the step of creating multipoint geostatistical simulations are separate.

10. A computer-implemented method according to claim 9, wherein the search tree is stored in RAM memory or saved to a physical storage device, allowing later reuse in one or more simulation.

* * * * *